(12) United States Patent
Koyama et al.

(10) Patent No.: US 8,400,279 B2
(45) Date of Patent: Mar. 19, 2013

(54) WIRELESS COMMUNICATION TAG AND WIRELESS COMMUNICATION SYSTEM

(75) Inventors: Toshimi Koyama, Tokyo (JP); Jun Fujimoto, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1120 days.

(21) Appl. No.: 12/252,836

(22) Filed: Oct. 16, 2008

(65) Prior Publication Data

US 2009/0102614 A1 Apr. 23, 2009

(30) Foreign Application Priority Data

Oct. 17, 2007 (JP) ................................. 2007-270097

(51) Int. Cl.
| | |
|---|---|
| H04Q 5/22 | (2006.01) |
| G08B 1/08 | (2006.01) |
| H04B 5/00 | (2006.01) |
| G01S 13/08 | (2006.01) |
| G06F 19/00 | (2011.01) |

(52) U.S. Cl. ............... 340/10.51; 340/572.1; 340/572.7; 340/10.2; 340/10.5; 455/41.1; 455/73; 455/41.2; 342/51; 342/44; 342/42; 235/385; 235/375; 235/492; 235/432

(58) Field of Classification Search ............... 340/10.51, 340/10.1, 572.7, 572.1, 10.4, 572.8, 10.34, 340/10.41, 10.3, 10.2, 572.5; 342/51, 44, 342/42; 343/700 R, 895, 742, 767; 235/385, 235/375, 492, 435; 455/41.1, 73, 41.2
See application file for complete search history.

(56) References Cited

U.S. PATENT DOCUMENTS

| | | | | |
|---|---|---|---|---|
| 4,550,444 A | * | 10/1985 | Uebel | 340/10.34 |
| 4,827,395 A | * | 5/1989 | Anders et al. | 700/9 |
| 5,889,273 A | * | 3/1999 | Goto | 235/492 |
| 6,054,935 A | * | 4/2000 | Urbas et al. | 340/870.17 |
| 6,281,794 B1 | * | 8/2001 | Duan et al. | 340/572.1 |
| 7,271,727 B2 | * | 9/2007 | Steeves | 340/572.7 |
| 7,479,886 B2 | * | 1/2009 | Burr | 340/572.7 |
| 2006/0132302 A1 | * | 6/2006 | Stilp | 340/539.22 |

FOREIGN PATENT DOCUMENTS

JP 2007-34951 A 2/2007

* cited by examiner

*Primary Examiner* — Daniel Wu
*Assistant Examiner* — Mancil Littlejohn
(74) *Attorney, Agent, or Firm* — KMF Patent Services, PLLC; Kenneth M. Fagin, Esq.

(57) ABSTRACT

A wireless communication tag according to the present invention includes a first antenna 8 previously set with predetermined identification information, and for wirelessly communicating various types of data with a reader/writer 6; a controller (IC chip 14) for controlling the data communicated through the first antenna; a second antenna 10 for receiving an electromotive radio wave 4e for causing electric power by a radio wave; and a charging unit (rectifying circuit 16 and a capacitor 18) for causing electric power by the electromotive radio wave received from the second antenna as well as for storing the caused electric power. With use of the electric power stored in the charging unit, the first antenna supplies data relating to the identification information to the reader/writer. The second antenna also can provide the reader/writer with the identification information.

11 Claims, 2 Drawing Sheets

WIRELESS COMMUNICATION TAG AND WIRELESS COMMUNICATION SYSTEM

CROSS-REFERENCE TO RELATED APPLICATIONS

This application claims priority of Japanese Patent Application No. 2007-270097 filed on Oct. 17, 2007. The contents of this application are incorporated herein by reference in their entirety.

BACKGROUND OF THE INVENTION

1. Field of the Invention

The present invention relates to a wireless communication tag, which makes wireless communication with a reader/writer, and a wireless communication system using the wireless communication tag.

2. Description of the Related Art

Conventionally, a communication tag using an RFID tag, for example, is roughly divided into two types, i.e., an active type and a passive type, in view of the associated communication system. For the active type, a battery is loaded as a power supply source for activating the wireless communication tag. On the other hand, for the passive type, power is externally supplied for activating the wireless communication tag. The active-type communication tag is not only costly, but also requires battery discarding or replacement at cycle of several years because the battery must be loaded. On the other hand, the passive-type communication tag can achieve low cost and extended service life, and therefore, its expanded use is anticipated.

Three communication systems of the passive type are available which are represented by an electromagnetic coupling system, an electromagnetic induction system, and a radio wave system. These three systems are selectively used depending on a frequency for use. For example, a wireless communication tag 1 of the radio wave system is generally configured to have an RFIDIC chip 3 and a transmitting and receiving antenna 5, as shown in FIG. 2, and performs radio communication with a reader/writer (not shown). For example, a UHF band or a microwave band is utilized as a radio wave frequency band. Furthermore, a dipolar antenna 5 which forms an entire length of a half wavelength ($\lambda/2$) of a radio wave, for example, is utilized as the transmitting and receiving antenna 5.

In this case, the wireless communication tag 1 of the passive type is charged by receiving through the dipolar antenna 5 a radio wave (a readout radio wave) transmitted from the reader/writer. While the received radio wave is employed as power supply, the wireless communication tag 1 activates the IC chip 3, thereby communicating the ID (identification information) stored in the IC chip 3 to the reader/writer.

With the conventional wireless communication tag of the passive type as described above, a communication distance is undesirably limited according to the amount of power charge when the tag communicates the ID (identification information) with the reader/writer. Therefore, it has been necessary for this wireless communication tag to continuously receive a radio wave (a readout radio wave) transmitted from the reader/writer until an amount of power charge sufficient to make communication is obtained. Further, it has been necessary to ensure an electric field with enough intensity required for power charge. In view of the circumstances described above, Japanese Laid-open Patent Publication No. 2007-34951 proposes art of always supplying power for activating the wireless communication tag from a commercially available power supply, thereby ensuring the sufficient amount of power charge anytime and increasing a communication distance between the reader/writer and the wireless communication tag.

In the above-described art proposed in Japanese Laid-open Patent Publication No. 2007-34951, however, a configuration for connecting the commercially available power source must be additionally set up, thus resulting in a complicated wireless communication tag structure and high manufacturing cost. Furthermore, with this art, a condition for using the wireless communication tag is limited under an environment where the commercially available power source can be ensured, so that a certain limitation is undesirably imposed on an environment of using this wireless communication tag.

The present invention has been made in order to solve the above-described problems. It is an object of the present invention to provide a low-cost wireless communication tag and a wireless communication system, that ensure the sufficient amount of power charge regardless of a use environment to thereby increase a communication distance with the reader/writer.

SUMMARY OF THE INVENTION

A first aspect of the present invention is directed to a wireless communication tag previously set with predetermined identification information. The wireless communication tag includes: (i) a first antenna for wirelessly communicating various types of data with a reader/writer; (ii) a controller for controlling the data communicated through the first antenna; (iii) a second antenna for receiving an electromotive radio wave for generating electric power by a radio wave; and (iv) a charging unit for causing electric power by the electromotive radio wave received from the second antenna as well as for storing the caused electric power. The electric power stored in the charging unit is used, thereby allowing either one of the first and second antennas to provide, to the reader/writer, data relating to the identification information.

According to the first aspect of the present invention, an electric power is caused at very low cost and the thus caused electricity can be sufficiently stored in the charging unit, by forming an antenna (the second antenna) that receives the electromotive radio wave to cause the electric power by the radio wave, separately from an antenna (the first antenna) that wirelessly communicates the data relating to the predetermined identification information (for example, RFID) with the reader/writer. Therefore, the sufficient charging amount can be ensured regardless of use environment, thereby making it possible to use the thus stored electricity at the time of providing the reader/writer with the data relating to the identification information, so that stable telecommunication can be performed (specifically, a communication distance between the wireless communication tag and the reader/writer can be lengthened).

A second aspect of the present invention is directed to a wireless communication tag constituted as set forth below. In the second aspect, the second antenna wirelessly transmits the data relating to the identification data to the reader/writer when the first antenna wirelessly receives the data from the reader/writer.

According to the second aspect of the present invention, transmission and reception of the data relating to the identification information can be performed by purpose-built antennas, respectively. Specifically, the data can be received by the first antenna and transmitted by the second antenna, so that the data can be transmitted and received efficiently.

A third aspect of the present invention is directed to a wireless communication tag as set forth below. In the third aspect, a radio wave frequency (for example, a UHF band (band between 860 and 960 MHz) at the time of communication between the first antenna and the reader/writer, and a frequency (for example, a band of 13.56 MHZ or 2.45 GHz) of the electromotive radio wave received from the second antenna are set different from each other.

According to the third aspect of the present invention, frequency accuracy, stability, modulation, and the like of the electromotive radio wave received by the second antenna can be set completely independently from the radio wave transmitted from the reader/writer and received by the first antenna. In this manner, the first and second antennas can be prevented from interfering with each other in the case of using radio waves of the same frequency. At the same time, the output frequency of the electromotive radio wave, for example, can be set within a frequency band in which the radio wave output is under loose regulation. As a result, the electromotive radio wave is transmitted on the condition that output thereof is increased, so that the wireless communication tag 2 can be improved in the electromotive efficiency and the charging efficiency.

A fourth aspect of the present invention is directed to a wireless communication tag as set forth below. In the fourth aspect, a memory unit for previously storing the identification information as well as for storing the data controlled by the controller.

According to the fourth aspect of the present invention, a freedom degree of capacity design for storing the data is increased realize the wireless communication tag capable of communicating the large volumetric data.

A fifth aspect of the present invention is directed to a wireless communication tag as set forth below. In the fifth aspect, the charging unit includes a rectifying circuit and a secondary battery unit (such as a lithium battery or a capacitor). The secondary battery unit stores electromotive force rectified by the rectifying circuit upon receipt of the electromotive radio wave from the second antenna.

According to the fifth aspect of the present invention, the wireless communication tag according to the first aspect can be charged with electricity upon converting alternating voltage into direct voltage.

A sixth aspect of the present invention is directed to a wireless communication tag as set forth below. In the sixth aspect, the rectifying circuit is formed as a bridge circuit.

According to the sixth aspect of the present invention, the above rectifying circuit can be readily formed.

A seventh aspect of the present invention is directed to a wireless communication tag as set forth below. In the seventh aspect, the wireless communication tag further includes a resonant circuit.

According to the seventh aspect of the present invention, formation of the simply constructible resonant circuit allows the tag to cause the electric power thereinside by the resonance thereinside, thus achieving low-cost production and ensuring the sufficient amount of power charge regardless of use environment.

An eighth aspect of the present invention is directed to a wireless communication tag as set forth below. In the eighth aspect, the second antenna is configured of a resonant circuit.

According to the eighth aspect of the present invention, formation of the simply constructible resonant circuit allows the tag to cause the electric power thereinside by the resonance thereinside, thus achieving low-cost production and ensuring the sufficient charging amount regardless of the use environment.

A ninth aspect of the present invention is directed to a wireless communication tag, including: (i) an IC device for storing predetermined identification information; (ii) a first antenna for receiving from an external reader/writer, a first radio wave including a reading-command signal, and for transmitting to the external reader/writer, the predetermined identification information stored in the IC device and read out by the reading-command signal; (iii) a second antenna for receiving a second electromotive radio wave from an external predetermined device; and (iv) a charging unit for storing electric power caused by the second radio wave received from the second antenna. The wireless communication tag, in the case where the first radio wave received from the first antenna is strong, activates the IC device with a current caused by the received strong first radio wave, and reads out the predetermined identification information stored in the IC device, by the command signal included in the first radio wave. The wireless communication tag, in the case where the first radio wave received from the first antenna is weak, activates the IC device with a resultant current of a current caused by the received weak first radio wave and a current from the charging unit previously storing the electric power, and reads out the predetermined identification information stored in the IC device, by the command signal included in the first radio wave. The wireless communication tag transmits through the first antenna to the external reader/writer, the predetermined identification information read out of the IC device with use of a radio wave obtained from the resultant current including the current from the charging unit.

According to the ninth aspect of the present invention, the second antenna allows to generate electric power and allows the charging unit to store the generated electric power. Therefore, the wireless communication tag can stably communicate with the external reader/writer with use of the sufficient amount of electric power. When a weak radio wave is received from the first antenna 8, a current is generated using the electric power stored in a capacitor by the second antenna 10. Therefore, an advantageous effect can be attained such that data read out of an internal memory unit inside the IC chip 14 can be transmitted through the first antenna 8 to the reader/writer 6, with use of the weak radio wave obtained from the resultant current including the current from the capacitor 18, regardless of the low current obtained from the received weak radio wave. Furthermore, the electric power stored in the capacitor 18 by the second antenna 10 is used only when the radio wave received from the first antenna 8 is weak, so that the IC chip 14 can be efficiently supplied with the high electric power.

A tenth aspect of the present invention is directed to a wireless communication tag as set forth below. In the tenth aspect, the wireless communication tag further a diode disposed between the IC device and the charging unit, the diode for exercising ON/OFF control over the current supplied from the charging unit to the IC device, depending on intensity of the first radio wave received by the first antenna.

According to the tenth aspect of the present invention, the diode exhibits a rectifying behavior, which allows the IC device to be efficiently supplied with the electric power stored in the charging unit.

An eleventh aspect of the present invention is directed to a wireless communication system, including: (a) a reader/writer for transmitting a first radio wave including a reading-command signal; (b) a radio wave transmitting device for transmitting a second electromotive radio wave; and (c) a wireless communication tag. The wireless communication tag includes (i) an IC device for storing predetermined identification information; (ii) a first antenna for receiving a first radio wave from the reader/writer, and for transmitting to the reader/writer the predetermined identification information stored in the IC device read out by the command signal included in the first radio wave; (iii) a second antenna for receiving a second radio wave from the radio wave transmitting device; and (iv) a charging unit for storing electric power caused by the second radio wave received from the second antenna. The wireless communication tag, in the case where the first radio wave received from the first antenna is strong, activates the IC device with a current caused by the received strong first radio wave, and reads out the predetermined identification information stored in the IC device, by the command signal included in the first radio wave. The wireless communication tag, in the case where the first radio wave received from the first antenna is weak, activates the IC device with a resultant current of a current caused by the received weak first radio wave and a current from the charging unit previously storing the electric power, and reads out the predetermined identification information stored in the IC device, by the command signal included in the first radio wave. The wireless communication tag transmits through the first antenna to the reader/writer, the predetermined identification information read out of the IC device with use of a radio wave obtained from the resultant current including the current from the charging unit.

According to the eleventh aspect of the present invention, with use of the radio wave transmitted from the radio wave transmitting device, the second antenna allows to generate electric power and allows the charging unit to store the caused electric power. Therefore, the wireless communication tag can stably communicate with the external reader/writer with use of the sufficient amount of electric power. When a weak radio wave is received from the first antenna 8, a current is generated using the electric power stored in a capacitor by the second antenna 10. Therefore, an advantageous effect can be attained such that data read out of an internal memory unit inside the IC chip 14 can be transmitted through the first antenna 8 to the reader/writer 6, with use of the weak radio wave obtained from the resultant current including the current from the capacitor 18, regardless of the low current obtained from the received weak radio wave. Furthermore, the electric power stored in the capacitor 18 by the second antenna 10 is used only when the radio wave received from the first antenna 8 is weak, so that the IC chip 14 can be efficiently supplied with the high electric power.

A twelfth aspect of the present invention is directed to a wireless communication system as set forth below. In the twelfth aspect, the wireless communication system includes a diode disposed between the IC device and the charging unit, the diode for exercising ON/OFF control over the current supplied from the charging unit to the IC device, depending on intensity of the first radio wave received by the first antenna.

According to the twelfth aspect of the present invention, the diode exhibits a rectifying behavior, which allows the IC device to be efficiently supplied with the electric power stored in the charging unit.

The present invention can achieve a low-cost wireless communication tag and a wireless communication system, that ensure the sufficient amount of power charge regardless of a use environment to thereby increase a communication distance with the reader/writer.

DESCRIPTION OF THE PREFERRED EMBODIMENTS

Figure 1A:
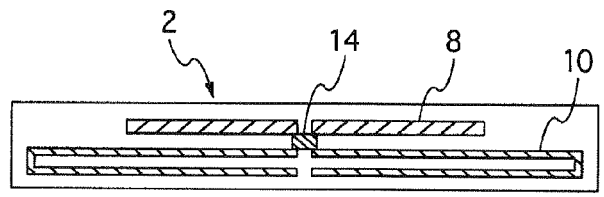
FIG. 1A is a side view showing a configuration of a wireless communication tag according to one embodiment of the present invention.

Hereinafter, a wireless communication tag and a wireless communication system, according to a first embodiment of the present invention, will be described with reference to the accompanying drawings.

This embodiment assumes a wireless communication tag of the passive type, in which electric power is generated by a radio wave. The wireless communication tag 2, as shown in FIG. 1D, for example, stores (becomes charged with) electric power produced by an electromotive radio wave 4e transmitted from a radio wave transmitting device 4. While the stored electric power is employed as power supply, the wireless communication tag 2 can read (or write) various types of data from (into) a reader/writer 6 (actually, a communication antenna 6t connected to the reader/writer 6).

A function required for the radio wave transmitting device 4 is only to transmit the electromotive radio wave 4e with a frequency receivable by the wireless communication tag 2. Thus, commercially available transmitting devices can be arbitrarily selectively applied to the radio wave transmitting device 4. In this case, a frequency of the electromotive radio wave 4e is set in response to a frequency receivable by a second antenna 10 of the wireless communication tag 2 described later, and therefore, the frequency is not numerically limited in particular. Furthermore, as the communication antenna 6t, a UHF antenna with high communication accuracy (sensitivity, transmission gain, or the like) may be applied, for example.

Figure 1B:
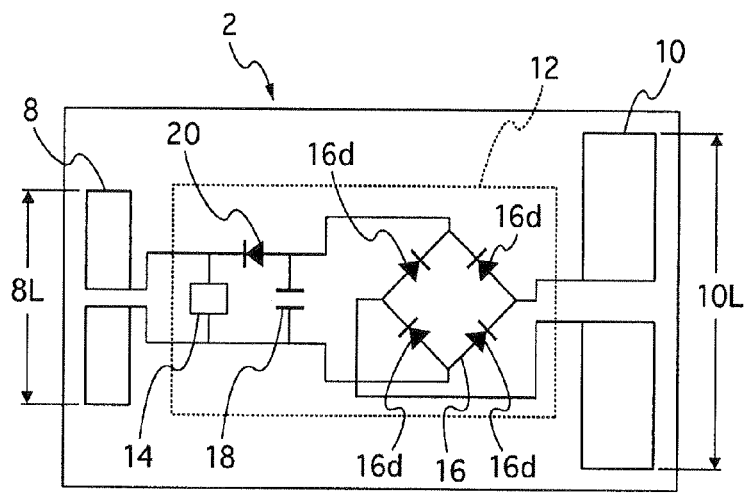
FIG. 1B is a plan view showing the configuration of the wireless communication tag shown in FIG. 1A.
Figure 1C:
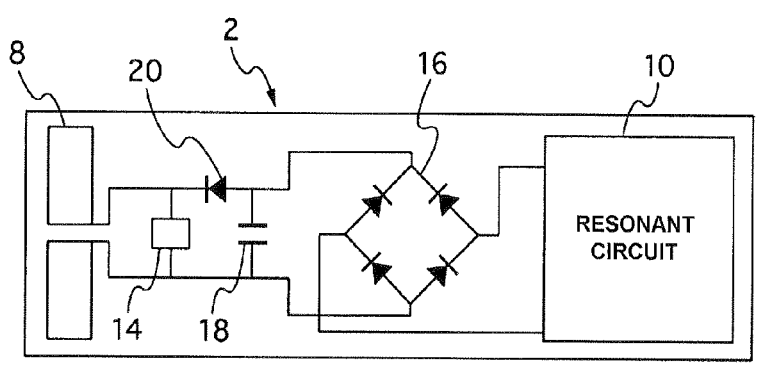
FIG. 1C is a plan view showing a configuration of a wireless communication tag according to another embodiment of the present invention.
Figure 1D:
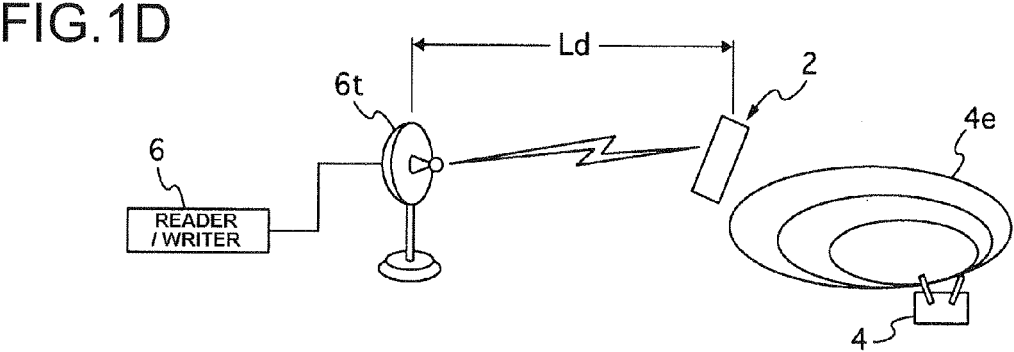
FIG. 1D is a view showing a configuration of a wireless communication system using the wireless communication tag of the present invention.
Figure 2:
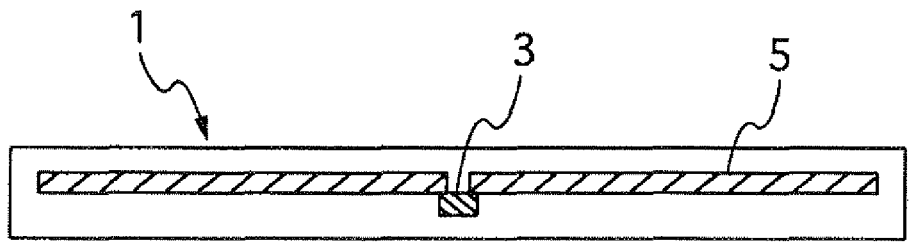
FIG. 2 is a side view showing a configuration of an existing wireless communication tag.

As shown in FIGS. 1A and 1B, at the wireless communication tag 2 according to this embodiment, there are provided: a first antenna 8 for wirelessly communicating various types of data with the reader/writer 6 (the communication antenna 6t); the second antenna 10 for receiving the electromotive radio wave 4e transmitted from the radio wave transmitting device 4 (FIG. 1D); and a transponder 12 (FIG. 1D) for executing operation of transmitting the data relating to the predetermined identification information previously set in the wireless communication tag 2 to the reader/writer 6 (FIG. 1D).

The transponder 12 has a function of relaying and transmitting the received data (electrical signal) or sending any of reply signals back based on the abovementioned data (electrical signal). To perform this function, the transponder 12 according to this embodiment has: a controller for controlling data communicated (received) by the first antenna 8; a charging unit for generating electric power by the electromotive radio wave 4e as well as for storing the thus generated electric power; and a memory unit for previously storing identification information as well as for storing the data controlled by the controller.

The controller is provided with an IC chip 14. The IC chip 14 is configured as an integrated circuit which is integrated with constituent elements (not shown) such as a transistor, a diode, various types of memory units (such as a ROM and a RAM), and a resistor. In this case, various types of memory units of the controller may be applied or a memory element (not shown) such as a flash memory may be additionally provided in the wireless communication tag 2. Accordingly, the flexibility of a capacity design for storing the data relating to the identification information (RFID) is increased to realize the wireless communication tag 2 that is capable of communicating the large volumetric data.

As the first antenna 8, the existing antenna (for example, a dipolar antenna or a loop antenna), that can wirelessly communicate with the reader/writer 6, may be arbitrarily applied depending on intended use or use environment of the wireless communication tag 2. In this case, it is preferable that an entire length (an antenna length) 8L of the first antenna 8 be set to a half wavelength ($\lambda/2$) of data (a radio wave) communicated between the wireless communication tag 2 and the reader/writer 6. In this manner, a communication gain (transmission gain) reaches its maximum value, thereby realizing efficient data (a radio wave) communication.

At the charging unit, a rectifying circuit 16 and a charging capacitor 18, which serves as a secondary battery unit, are provided. Upon receipt of the electromotive radio wave 4*e* from the second antenna 10, an electromotive force rectified by the rectifying circuit 16 is stored in the charging capacitor 18. In this case, the rectifying circuit 16 includes various systems such as a half-wave rectification system and a bridge rectification system. The half-wave rectification system can be constructed of a single diode, whereas the bridge rectification system is provided to rectify a current by using four diodes. For example, the rectifying circuit 16 in this embodiment is formed as a bridge circuit with the use of four diodes 16*d*. In this manner, the wireless communication tag 2 can be always supplied with a stable direct-current voltage (current). In addition to the charging capacitor 18, a lithium battery may be formed as the secondary battery unit as long as it is designed to store (become charged with) a voltage (current), or alternatively, the plurality of secondary battery units may be formed.

Furthermore, a diode 20 is intervened between the aforementioned charging unit (the capacitor 18) and the controller (the IC chip 14). The diode 20 exercises ON/OFF control over a direct-current voltage (current) to be applied from the capacitor 18 to the IC chip 14 at the time that the wireless communication tag reads (writes) various types of data through the wireless communication with the reader/writer 6 (the communication antenna 6*t*) by activating the IC chip 14 by means of the electric power (electric charge or electric energy) stored (charged) in the capacitor 18.

A description will be given with respect to a case in which the capacitor 18 is charged using the second antenna 10 in the wireless communication tag 2 with the above-described structure. The second antenna 10 always receives the electromotive radio wave 4*e* for storing the electric power in the capacitor 18. Hereinafter, a specific explanation will be given.

When the second antenna 10 receives the electromotive radio wave 4*e* transmitted from the radio wave transmitting device 4, the alternating-current voltage (current) is applied (output) to the transponder 12 through the second antenna 10. The electromotive radio wave 4*e* is defined herein as an electromagnetic wave that is propagated while an electric field and a magnetic field are alternately generated. When an alternating magnetic field acts on the second antenna 10, the alternating-current voltage (electric current) that has been converted through the second antenna 10 is applied (output) to the transponder 12.

At this time, the alternating-current voltage (current) applied (output) to the transponder 12 is converted into direct voltage (current) through the two upper diodes 16*d* of the rectifying circuit 16, and thereafter, the thus converted direct voltage is stored (charged) in the capacitor 18. The direct voltage is continuously stored (charged) while the second antenna 10 of the wireless communication tag 2 receives the electromotive radio wave 4*e* transmitted from the radio wave transmitting device 4. Accordingly, the capacitor 18 of the wireless communication tag 2 is kept in a fully charged condition at all times. As described above, the electric power stored in the capacitor 18 through the antenna 10 is used to activate the IC chip 14 as well as to generate a strong radio wave to be transmitted from the first antenna 8 to the reader/writer 6, when the first antenna 8 receives a weak radio wave from the reader/writer 6, as described later.

Next, a description will be given with respect to the wireless communication tag 2 according to this embodiment in the case where a radio wave that the first antenna 8 receives from the communication antenna 6*t* of the reader/writer 6 is strong and the case where the radio wave is weak. In the wireless communication tag 2, upon reading data relating to the identification information out of an internal memory unit of the IC chip 14, the reader/writer 6 transmits the radio wave including the command signal to the first antenna 8 through the communication antenna 6*t*.

First, a case in which the first antenna 8 receives a strong radio wave will be explained. When a radio wave that the first antenna 8 receives is strong, this radio wave generates electric power, and thus, a current flows into the IC chip 14. The IC chip 14 is activated by this current, whereas the data relating to the identification information (such as an identification code peculiar to the tag and information relating to a use environment of the tag) stored in the internal memory unit of the IC chip 14 is read out by a command signal included in the radio wave. The read-out data is transmitted from the first antenna 8 to the reader/writer 6 with use of the strong radio wave obtained from the generated current described above. Specifically, when the radio wave that the first antenna 8 receives is strong, the data is read out of the IC chip 14 and transmitted to the reader/writer 6 only with use of the current obtained from the radio wave received by the first antenna, without consuming the electric power of the capacitor 18 storing the electric charge by the electromotive radio wave 4*e* received from the second antenna 10. In the case where the first antenna 8 receives the strong radio wave, a voltage at a side of the first antenna 8 increases, so that current does not flow from the diode 20 to the IC chip 14 by using the electric charge of the capacitor 18 resulting from the rectifying behavior of the diode 20 achieved by a reverse bias.

Next, such a case is explained, that the first antenna 8 receives a weak radio wave. When the radio wave that the first antenna 8 receives is weak, the voltage at the side of the first antenna 8 decreases, so that the current flows from the diode 20 to the IC chip 14 by using the electric charge of the capacitor 18 resulting from the rectifying behavior of the diode 20 achieved by a reverse bias. In this case, the current for activating the IC chip 14 is a resultant current of a current from the capacitor 18 storing the electric charge and a current obtained from the weak radio wave received from the first antenna 8. The IC chip 14 is activated by this resultant current whereas the data relating to the identification information stored in the internal memory unit of the IC chip 14 is read out by the command signal included in the radio wave. The read-out data is transmitted from the first antenna 8 to the reader/writer 6 with the strong radio wave obtained from the aforementioned resultant current. Specifically, in the case where the radio wave that the first antenna 8 receives is weak, the data is read out of the IC chip 14 and transmitted to the reader/writer 6 with use of the electric power stored in the capacitor 18 by the second antenna 10.

As described above, the wireless communication tag 2 according to this embodiment generates the current using the electric power previously stored in the capacitor 18 by the second antenna 10, in the case of receipt of the weak radio wave from the first antenna 8. Therefore, this wireless communication tag 2 can attain such an advantageous effect that the data read out of the internal memory unit of the IC chip 14 can be transmitted to the reader/writer 6 through the first antenna 8, with use of the strong radio wave obtained from the resultant current including the current from the capacitor 18, regardless of the low current obtained from the aforementioned received weak radio wave. Furthermore, the electric power stored in the capacitor 18 by the second antenna 10 is used only when the radio wave that the first antenna 8 receives is weak, so that the IC chip 14 can be sufficiently supplied with the high electric power.

According to this embodiment, the charging unit (the capacitor 18) can efficiency store (become charged with) electric power in a short period of time, and thus, can be kept in a fully charged condition regardless of environment of using the wireless communication tag 2 because the second antenna 10 that receives the electromotive radio wave 4e for charging the charging unit is formed separately from the first antenna 8 that wirelessly communicates the predetermined data (the readout radio wave, for example) with the reader/writer 6. In this manner, when providing the reader/writer 6 with the data relating to the identification information, use of the electric power (electric charge or electric energy) in a fully charged condition enables the wireless communication tag 2 to perform steady telecommunication at all times.

According to this embodiment, furthermore, the charging unit (the capacitor 18) can be always maintained in a fully charged state, thus making it possible to always maintain an output of the data transmission to its required maximum, when the data relating to the identification information is supplied to the reader/writer 6. In this manner, a communication distance Ld (FIG. 1D) between the wireless communication tag 2 and the reader/writer 6 (specifically, the communication antenna 6t connected to the reader/writer 6) can be increased more significantly in comparison with that of the related art.

According to this embodiment, yet furthermore, the data can be efficiently transmitted and received by forming the second antenna 10 designed exclusively for receipt of the electromotive radio wave 4e for charging the charging unit, separately from the first antenna 8 designed exclusively for reception of the data (the readout radio wave). In this case, it is preferable that a radio wave frequency (for example, a UHF band (band between 860 and 960 MHz) at the time of communication between the first antenna 8 and the reader/writer 6, and a frequency (for example, a band of 13.56 MHz or 2.45 GHz) of the electromotive radio wave 4e received from the second antenna 10 be set to be different from each other.

With the above setting, the frequency accuracy, stability, and modulation or the like, of the electromotive radio wave 4e received by the second antenna 10 can be set completely independently from the radio wave transmitted from the reader/writer 6 and received by the first antenna 8. In this manner, the first and second antennas 8, 10 can be prevented from interfering with each other in the case of using radio waves of the same frequency. At the same time, an output frequency of the electromotive radio wave 4e, for example, can be set within a frequency band in which the radio wave output is under loose regulation. As a result, the electromotive radio wave 4e is transmitted on condition that an output thereof is increased, so that the wireless communication tag 2 can be improved in electromotive efficiency and charging efficiency. In the case where a frequency band, which is available for use in communication, is limited, the frequency band, which is actually available, becomes narrower because the frequency bands at both ends are set to guard bands for preventing interference with adjacent frequency bands. Therefore, a great advantage is attained by the fact that the output frequency of the electromotive radio wave 4e can be set within a frequency band in which the radio wave output is loosely regulated.

According to this embodiment, furthermore, the electromotive radio wave 4e for charging the charging unit of the wireless communication tag 2 is not used to read out the data relating to the identification information stored in the IC chip 14, thus making it completely unnecessary to consider the frequency accuracy, stability, modulation or the like, of the electromotive radio wave 4e. Therefore, the radio wave transmitting device 4 for transmitting the electromotive radio wave 4e can be made up of a simple transmitting device and antenna only, thus allowing the device to be produced at very low cost. Accordingly, the wireless communication system (FIG. 1D) having the radio wave transmitting device 4, the wireless communication tag 2, and the reader/writer 6 (the communication antenna 6t) can be readily realized at low cost.

In the wireless communication system as described above, it is possible to ensure the sufficient amount of electric power for driving the wireless communication tag 2 from the charging unit over a long period of time, even in location with a low electric field intensity or under a poor radio-wave condition. Thus, the data relating to the identification information can be stably transmitted and received, whereas telecommunication can be realized.

As the second antenna 10 according to the embodiment described above (the wireless communication tag 2 and the wireless communication system), furthermore, the existing antenna (such as a dipolar antenna or a loop antenna) that can wirelessly communicate with the radio wave transmitting device 4 may be arbitrarily applied depending on intended use or use environment of the wireless communication tag. With respect to the second antenna 10, it is preferable that an entire length (an antenna length) 10L (FIG. 1B) thereof be set to a half wavelength ($\lambda/2$) of the data (the radio wave) communicated between the wireless communication tag 2 and the radio transmitting device 4. In this manner, the communication gain (transmission gain) reaches its maximum value, thereby realizing the efficient data (radio wave) communication.

In this case, the antenna length 10L of the second antenna 10 can be arbitrarily (freely) set regardless of the antenna length of the first antenna 8 as described above, and thus, it is not numerically limited in particular.

In the foregoing embodiment, various types of data (such as the data relating to the identification information) stored in the memory of the IC chip 14 may be arranged to be wirelessly transmitted and received between the second antenna 10 and the reader/writer 6.

While the foregoing embodiment assumedly described that the dipolar antenna or the loop antenna is used as the second antenna 10 of the wireless communication tag 2, instead of these antennas, a resonant circuit may be used to construct the second antenna 10, as shown in FIG. 1C.

When the electromotive radio wave 4e transmitted from the radio wave transmitting device is applied, the above resonant circuit generates a natural oscillation, and then, resonates, whereby the electric power (the electric charge or the electric energy) is stored (charged) in the capacitor 18 through the rectifying circuit 16. While the thus generated electric power is employed as power supply, the identification information can be read through the wireless communication of the data with the reader/writer 6 in a manner similar to that in the above described embodiment. In this manner, provision of the simply constructible resonant circuit allows the wireless communication tag to internally generate the electric power, thus achieving low-cost production and ensuring the sufficient amount of power charge regardless of the use environment. The resonant circuit may be installed in plural. Installing the plurality of resonant circuits in this manner allows the single wireless communication tag 2 to be used with a plurality of frequency bands. For example, it becomes possible to construct one resonant circuit with a UHF band and the other resonant circuit with a 13.56 MHz band (or 2.45 GHz band). Therefore, frequencies can be used in combination or selectively used depending on each of the intended uses or location described later. Furthermore, the amount of electric power generated by each of the resonant circuits is increased by providing the plurality of resonant circuits, so that electric power can be stored (charged), thus making it possible to cover the required amount of electric power due to upsizing of the wireless communication tag 2.

The second antenna 10 and the resonant circuit may be constructed for use in combination (not shown). In this case, with the electric power received by the second antenna 10 and the electric power generated in the resonant circuit, lower-cost production can be achieved and the sufficient amount of power charge can be ensured regardless of the use environment.

While, in the wireless communication tag 2 according to the foregoing embodiment, the data relating to the identification information read out of the internal memory unit of the IC chip 14 is transmitted from the first antenna 8 to the reader/writer 6, this invention is not limitative thereto. For example, the data relating to the identification information may be transmitted from the second antenna 10 to the reader/writer 6. In this case, when the IC chip 14 is activated with the predetermined current described above, the predetermined current flows through the two lower-side diodes 16d of the rectifying circuit 16 to the second antenna 10. Furthermore, in the case where the radio wave from the second antenna 10 is received at the side of the reader/writer 6, it is preferable that the reader/writer 6 include a receiving antenna which covers a frequency band of the second antenna 10, in addition to the communication antenna 6t designed for communication with the first antenna 8.

While, in the foregoing embodiment, intended use of the wireless communication tag 2 was not particularly mentioned, the wireless communication tag 2 is applicable to a variety of intended uses such as a distribution use, a history management use, and a presence management use. In the distribution use, the wireless communication tag 2 is affixed to products at the stage of production at a factory to thereby keep track of transportation of the products through a subsequent delivery route. In the history management use, the wireless communication tag 2 is used to record history information relevant to: through which route the product was passed; how it was processed; to which it was delivered; and the like in a distribution process of the product. In the presence management use, the wireless communication tag 2 is used to manage presence information relevant to a current location indicating where a target person is now.

What is claimed is:

1. A wireless communication tag previously set with predetermined identification information, the wireless communication tag comprising:
   (i) a first antenna for wirelessly communicating various types of data between a reader/writer and an IC device;
   (ii) a controller for controlling the data communicated through the first antenna;
   (iii) a second antenna for receiving an electromotive radio wave for generating electric power from an electromotive radio wave; and
   (iv) a charging unit for generating electric power from the electromotive radio wave received by the second antenna as well as for storing the generated electric power,
   wherein:
   the electric power stored in the charging unit is used, thereby allowing either one of the first and second antennas to provide, to the reader/writer, data relating to the identification information,
   the wireless communication tag further comprises a diode disposed between the IC device and the charging unit, and
   the diode exercises ON/OFF control of direct current voltage that is applied from the charging unit to the IC device, in order to activate the IC device by means of electric power generated and stored by the charging unit, when a radio wave that is received by the first antenna is weak.

2. The wireless communication tag according to claim 1, wherein:
   the second antenna wirelessly transmits the identification data to the reader/writer when the first antenna wirelessly receives the identification data from the reader/writer.

3. The wireless communication tag according to claim 1, wherein:
   a radio wave frequency at the time of communication between the first antenna and the reader/writer and a frequency of the electromotive radio wave received from the second antenna are set different from each other.

4. The wireless communication tag according to claim 1, wherein:
   a memory unit for previously storing the identification information as well as for storing the data controlled by the controller.

5. The wireless communication tag according to claim 1, wherein:
   the charging unit includes a rectifying circuit and a secondary battery unit; and
   the secondary battery unit stores an electromotive force rectified by the rectifying circuit upon receipt of the electromotive radio wave from the second antenna.

6. The wireless communication tag according to claim 5, wherein:
   the rectifying circuit is formed as a bridge circuit.

7. The wireless communication tag according to claim 1, further comprising a resonant circuit.

8. The wireless communication tag according to claim 1, wherein:
   the second antenna is configured of a resonant circuit.

9. A wireless communication tag, comprising:
   (i) an IC device for storing predetermined identification information;
   (ii) a first antenna for receiving, from an external reader/writer, a first radio wave including a reading-command signal and for transmitting, to the external reader/writer, the predetermined identification information stored in the IC device and read out by the reading-command signal;

(iii) a second antenna for receiving a second electromotive radio wave from an external predetermined device; and
(iv) a charging unit for storing electric power generated from the second radio wave received by the second antenna, wherein:

in the case where the first radio wave received by the first antenna is strong, the wireless communication tag activates the IC device with a current caused by the received strong first radio wave and reads out the predetermined identification information stored in the IC device in response to the command signal included in the first radio wave;

in the case where the first radio wave received from the first antenna is weak, the wireless communication tag activates the IC device with a resultant current of a current caused by the received weak first radio wave and a current from the charging unit previously storing the electric power and reads out the predetermined identification information stored in the IC device in response to the command signal included in the first radio wave;

the wireless communication tag transmits, through the first antenna to the external reader/writer, the predetermined identification information read out of the IC device with use of a radio wave obtained from the resultant current including the current from the charging unit;

the wireless communication tag further comprises a diode that is disposed between the IC device and the charging unit; and the diode exercises ON/OFF control of a direct current voltage that is applied from the charging unit to the IC device in order to activate the IC device by means of electric power generated and stored by the charging unit when a radio wave that is received by the first antenna is weak.

10. A wireless communication system, comprising:
(a) a reader/writer for transmitting a first radio wave including a reading-command signal;
(b) a radio wave transmitting device for transmitting a second, electromotive radio wave; and
(c) a wireless communication tag including:
  (i) an IC device for storing predetermined identification information;
  (ii) a first antenna for receiving a first radio wave from the reader/writer and for transmitting to the reader/writer the predetermined identification information stored in the IC device read out in response to the command signal included in the first radio wave;
  (iii) a second antenna for receiving a second radio wave from the radio wave transmitting device; and
  (iv) a charging unit for storing electric power generated from the second radio wave received from the second antenna, wherein:

in the case where the first radio wave received from the first antenna is strong, the wireless communication tag activates the IC device with a current caused by the received strong first radio wave and reads out the predetermined identification information stored in the IC device in response to the command signal included in the first radio wave;

in the case where the first radio wave received from the first antenna is weak, the wireless communication tag activates the IC device with a resultant current of a current caused by the received weak first radio wave and a current from the charging unit previously storing the electric power and reads out the predetermined identification information stored in the IC device in response to the command signal included in the first radio wave;

the wireless communication tag transmits, through the first antenna to the reader/writer, the predetermined identification information read out of the IC device with use of a radio wave obtained from the resultant current including the current from the charging unit;

the wireless communication tag further comprises a diode that is disposed between the IC device and the charging unit; and the diode exercises ON/OFF control of a direct current voltage that is applied from the charging unit to the IC device in order to activate the IC device by means of electric power generated and stored by the charging unit when a radio wave that is received from the first antenna is weak.

11. A wireless communication tag, comprising:
(i) an IC device for storing predetermined identification information;
(ii) an antenna for receiving a first radio wave which is inclusive of a command signal from a reader/writer, in order to transmit the predetermined identification information stored in the IC device to the reader/writer, and for receiving a second, electromotive radio wave from an external predetermined device;
(iii) a charging unit for generating electric power from the second radio wave received from the antenna and for storing the generated electric power; and
(iv) a current control unit which is disposed between the IC device and the charging unit for exercising ON/OFF control of a current to be supplied from the charging unit to the IC device in accordance with an intensity of the first radio wave received by the antenna, wherein the current control unit exercises ON/OFF control of a current 1) to read out the predetermined identification information stored in the IC device with use of an electromotive force obtained by the received first radio wave when the first radio wave received from the antenna is strong; and 2) to read out the predetermined identification information stored in the IC device with use of electric power stored in the charging unit when the first radio wave received from the antenna is weak, the electric power stored in the charging unit having been generated by reception of the second radio wave.

* * * * *